United States Patent Office 2,953,533
Patented Sept. 20, 1960

2,953,533

HIGHLY CROSS-LINKED NON FLAMMABLE POLYURETHANE FOAMS AND PREPARATION OF SAME

Antoine Khawam, East Orange, N.J., assignor to Allied Chemical Corporation, a corporation of New York No Drawing. Filed Apr. 4, 1958, Ser. No. 726,326

10 Claims. (Cl. 260—2.5)

This invention relates to the production of polyurethanes and more particularly refers to new and novel highly cross-linked polyurethane compositions and methods of preparation.

The preparation of polyurethane products possessing a certain degree of cross-linking is known. These products are usually obtained by first reacting a polyol, e.g. a polyester or polyether containing reactive terminal groups, such as hydroxyl, with an amount of organic polyisocyanate, especially diisocyanate, in excess of that required to react with the hydroxyl groups of the initial polymer. This results in the production of a prepolymer containing terminal isocyanate groups, which by reaction with glycols can be converted to reactive urethane groups, which in turn react with isocyanate groups to produce cross-linked high molecular weight "cured" polyurethanes. The glycols in this process serve as polymer chain extenders and provide reactive hydrogen atom containing urethane groups available for polymer cross-linking with polyisocyanate.

Of particular importance with which the present invention is concerned is the production of polyurethane foams containing large amounts of plasticizers or fire retardants. One of the major deficiencies of polyurethane foams is their flammability which can be overcome by incorporation into the foam of flame retardants in rather large amounts of at least 5% and generally at least 10% based on the total weight of the foam ingredients. However, the incorporation of such large amounts of fire retardant is detrimental to the isocyanate (foam-forming) reaction as well as to many important properties of the foam, notably dimensional stability and heat resistance. Thus, the flame retardant tends to migrate in the foam, causing gradual shrinkage and distortion of shape, which are greatly accelerated when the foam is subjected to elevated temperatures. Likewise, substantial amounts e.g. at least 5% of non-fire retardant plasticizers are incorporated into formulations for polyurethane foams to improve the flexibility and resilience of such foams. Unfortunately the presence of such large amounts of plasticizers have an adverse effect on foam-structure, notably dimensional stability and heat resistance.

An object of the present invention is to produce new superior cross-linked polyurethane materials. Another object is to provide a method of producing non-flammable polyurethane foams having superior physical properties. A further object of the present invention is to provide a method for the production of plasticized cellular polyurethane materials characterized by superior strength, dimensional stability and heat resistance. Other objects and advantages of the present invention will be apparent from the following description.

The objects are attained by carrying out the reaction of an organic polyisocyanate and a polyol, e.g. a polyester or polyether containing reactive terminal groups, such as hydroxyl, preferably a polyester, and a polyfunctional basic alcohol containing two tertiary amino groups and at least two primary alcoholic hydroxyl groups having the formula:

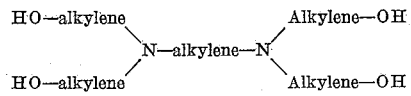

wherein alkylene means a divalent saturated aliphatic hydrocarbon radical containing from 1 to 10 carbon atoms, preferably from 2 to 4 carbon atoms, in which the alkylene chain may be interrupted by oxygen atoms, at least two of alkylene-OH groups contain primary alcoholic hydroxyl groups, said polyfunctional basic alcohol constituting from 0.1% to 30% preferably from 7% to 15% by weight based on the weight of polyol, said organic polyisocyanate being employed in an amount such that there is an excess of available isocyanate groups over the total number of hydroxyl groups from the polyol and the polyfunctional basic alcohol and an organic plasticizer in an amount of 5% to 50% preferably 10 to 30% by weight of the polyol, organic polyisocyanate and polyfunctional basic alcohol. The presence of two tertiary basic nitrogen atoms in the polyfunctional alcohol has an accelerating effect on the reaction between the isocyanate and hydroxyl groups, resulting in a rapidly curing polyurethane composition. The reaction may be carried out in the presence of other known additives such as accelerators, dispersing or emulsifying agents, fillers and water to provide polyurethane products having different characteristics.

A variety of organic polyisocyanates may be employed in the processes of the invention through arylene diisocyanates are generally preferred. Suitable organic diisocyanates are phenylene diisocyanates, tolylene diisocyanates (or isomeric mixtures thereof), naphthalene diisocyanates, 4,4'-diphenylmethane diisocyanate or substitution products thereof such as 3,3'-dialkyl or dihalogeno-, etc. Triisocyanates obtained by the reaction of three moles of an arylene diisocyanate with one mole of a triol, e.g. reaction product of three moles of tolylene diisocyanate and one mole of hexanetriol may also be used.

The amount of organic polyisocyanate utilized is such that there is an excess of available isocyanate groups over the total number of hydroxyl groups available from the polyol and the polyfunctional additive.

The above mentioned organic diisocyanates may be reacted with a linear or branched chain polyol, e.g. polyester or polyether. Suitable polyesters are obtained by the esterification condensation reaction of a dibasic carboxylic acid such as adipic acid, fumaric acid, sebacic acid, phthalic acid, etc. with a polyhydric alcohol such as ethylene glycol, diethylene glycol, propylene glycol, trimethylol propane, glycerol, etc. in such proportions that the resultant product possesses terminal OH and/or COOH groups reactive with isocyanate groups. Suitable polyesters also include the class of fatty acid glycerides having a hydroxyl number of at least about 50 such as castor oils, hydrogenated castor oils, blown soya oils, etc. Suitable polyethers include the polyalkylene glycols such as polyethylene glycols, polypropylene glycols having a molecular weight of at least 200.

When employing fatty acid glycerides in the processes of the present invention, the polyisocyanate is generally first reacted with the glyceride to form a prepolymer which is then treated with the polyfunctional basic alcohol optionally with other ingredients such as emulsifiers, water, additional catalysts to produce varying types of materials. If the reaction is carried out in the presence of water a cellular polyurethane product is formed. With polyethers and polyester alkyd resin type components, all the reactants may be mixed simultaneously in what is known as the "one-shot" method especially for producing cellular polyurethane materials.

The novel additives of the present invention are basic polyols of the general formula given hereinbefore, that is, containing two tertiary amino groups and at least two primary alcoholic hydroxyl groups whereby these compounds act in a two-fold capacity, that is as accelerator of the reaction with isocyanate groups and as reactant with the isocyanate. The amount of polyfunctional basic alcohol employed in the processes of the invention may be varied over a wide range, generally from 0.1% to 30% by weight based on the weight of polyol "contained" in the prepolymer when a prepolymer is employed, or from 0.1% to 30% by weight based on the weight of polyol when employing a foam formulation in the "one-shot" method.

The foams may be prepared in the usual manner by admixing and introducing into a mold the components composed of a polyester, polyisocyanate, water in the presence of the polyfunctional basic alcohol as cross-linking agent. Ordinarily the polyisocyanate being admixed is in an amount of at least 30%, and may be as high as 300% or more by weight of the polyester. The water should be in an amount enough to react with the isocyanate to liberate sufficient gas to produce a foam of the desired physical characteristics. From 0.5% to 10% water based on the weight of isocyanate will generally give good results. The mixing of the constituents may be carried out at an elevated temperature or under atmospheric conditions.

The preferred emulsifiers are of the non-ionic type, such as a monoether of a polyethylene glycol with an alkyl phenol, blends of poly alcohol carboxylic acid esters and oil soluble sulfonate ("Witco 77"), polyethylene glycol ricinoleate ("Emulphor EL-719"), sorbitan monolaurate ("Span 20"), and polyoxy alkylene derivatives of sorbitan monolaurate (e.g. "Tween 20" and "Tween 80"). Anionic emulsifiers such as sodium dioctyl sulfosuccinate may also be used. In general the amount of emulsifier required does not exceed 10% based on the polyester.

Prepolymers may be prepared by first reacting the diisocyanate with the polyester in the absence of water to form a prepolymer. In the preparation of polyurethane foam, the new polyfunctional basic alcohol cross-linking agent and dispersing agent may first be dissolved in water and this solution added to the prepolymer preferably at room temperature, and the resultant mixture agitated vigorously for a short time, usually less than a minute, and then poured into a mold. Foaming will start immediately. The rate of foaming may be increased considerably by heating the prepolymer prior to addition of catalyst mixture.

The invention permits the production of foams of low density, i.e. between 0.5 and about 3 lbs./cu. ft., possessing superior strength and dimensional stability.

The present invention is particularly valuable for preparing superior foams containing plasticizers, particularly flame retardant plasticizers.

One of the major deficiencies of polyesterurethane foams is their flammability. This can be overcome by incorporation into the foam of well known flame retardants, usually chlorinated phosphate esters, e.g. tris β-chloroethyl phosphate, tris chloropropyl phosphate, or esters of organic phosphonic acids, e.g. diallyl styrene phosphonate, diallyl phenyl phosphonate, diallyl toluene phosphonate, esters (e.g. diethyl, dibutyl, etc., esters) of halogenated organic acids, e.g. tetrachlorophthalic acid, dibromophthalic acid, dibromosuccinic acid, etc. To achieve a marked improvement in fire-resisting properties it is generally necessary to add at least about 5% and preferably at least 10% of flame retardant based on the total weight of the foam ingredients. However, the incorportion of such large amounts of fire retardant is detrimental to the isocyanate (foam-forming) reaction as well as to many important properties of the foam, notably dimensional stability and heat resistance. Thus the flame retardant tends to migrate in the foam, causing gradual shrinkage and distortion of shape, which are greatly accelerated when the foam is subjected to elevated temperatures.

The foregoing deficiencies can be overcome and superior foams containing substantial amounts of fire retardant can be obtained by use of the polyfunctional basic alcohol cross-linking agent defined above as illustrated in Example 5 below. Apparently, use of the novel cross-linking agents increases the size of the macromolecule considerably, producing a highly complex structure which is able to hold in place the comparatively small molecule of flame retardant. Further, when halogenated flame retardants are used, the basic tertiary nitrogen atoms of the novel cross-linking agents act as halogen scavengers, thereby improving the stability of the foam.

Likewise, substantial amounts (e.g. at least 5%) of non-fire retardant plasticizers may be incorporated into formulations for polyurethane foams to improve the flexibility and resilience of such foams. These plasticizers may be inert with respect to the polyisocyanate, e.g. dibutyl phthalate, dioctyl succinate, cyclohexyl levulinate, methyl abietate, tris(2-ethylhexyl) phosphate, etc., or may be reactive with the isocyanate groups, e.g. castor oil, mono- and difatty acid glycerides, polyethylene glycols, etc.

The more detailed practice of the invention is illustrated by the following examples, in which parts given are by weight and temperature in degrees centigrade.

EXAMPLE 1

Preparation of prepolymer 35 parts fine particulate silica (G. L. Cabot, Cab-o-Sil average particle size 0.015 to 0.02 micron diameter, dry bulk density 2.5–3.5 lbs. per cu. ft.) were dispersed in 1300 parts tolylene diisocyanate ("Nacconate 80," 80% 2,4-isomer, 20% 2,6-isomer) and the resulting mixture was slowly added with constant agitation to 1800 parts castor oil (Baker's Grade AA, hydroxyl No. 163) so that the temperature of the reaction mixture did not exceed 85°. The reaction mixture was then heated to 135° for one hour, and cooled to room temperature. The cooled prepolymer thus obtained should have a viscosity in the range of 40,000–70,000 centipoises at 25°. In the absence of moisture and activators the prepolymer can be stored for several months.

Production of foam 300 parts of the prepolymer was plasticized with 90 parts castor oil (Baker's Grade AA, hydroxyl No. 163), this mixture has a working life of 1 to 2 hours. To the plasticized prepolymer there was added rapidly with vigorous stirring 12 parts aqueous catalyst-dispersing agent mixture (100 parts water, 50 parts diethylethanolamine and 50 parts an aryl alkyl poly-ether alcohol "Triton X–100," non-ionic dispersing agent) and 30 parts tetrakis(2-hydroxyethyl) - ethylene - diamine, mixing was continued for less than 20 seconds when the foaming mass was poured into molds. The foam was allowed to expand freely, curing being completed at room temperature.

The fully cured foam had a density of 6 to 7 lbs. per cu. ft. a compression set of 3%, compression resistance modulus of 28 p.s.i., was semi-rigid and possessed an extremely fine, uniform cell structure. This type of foam is particularly suited for shock absorption applications such as the production of crash pads, carpet underlays, etc.

EXAMPLE 2

300 parts of the prepolymer prepared by the method in Example 1 was mixed with 90 parts castor oil, then an aqueous mixture of 30 parts tetrakis-(2-hydroxy - ethyl)-ethylenediamine, 3 parts dispersing agent ("Witco 77–86," blend of poly alcohol carboxylic acid esters and oil soluble sulfonates) and 6 parts water was rapidly stirred in to produce a foaming mass in about 20 seconds. The reaction mass was poured into molds, allowed to expand freely and cured at room temperature for twenty-four hours.

The resultant fine celled foamed polyurethane had a density of 9 lbs. per cu. ft., a compression set of 4% and a compression resistance modulus of 28 p.s.i.

EXAMPLE 3

100 parts of the prepolymer prepared by the method in Example 1 was mixed with 30 parts castor oil (Baker's Grade AA), then reacted with a mixture of 10 parts tetrakis(2 - hydroxyethyl)-ethylenediamine, 2 parts water and 1 part dispersing agent ("Tween 21," a polyoxyalkylene derivative of sorbitan monolaurate) according to the procedure outlined in Example 1.

The semi-rigid polyurethane foam so obtained had a density of 10.5 lbs. per cu. ft., a resilience of 10.1% and a very fine uniform cell structure.

EXAMPLE 4

*Preparation of prepolymer (low viscosity)*

A mixture consisting of 900 parts castor oil (Baker's Grade AA) and 700 parts tolylene diisocyanate ("Nacconate 80," 80% 2,4-isomer, 20% 2,6-isomer), was heated at 120–125° for one hour in an inert atmosphere. The cooled prepolymer thus obtained had a viscosity in the range of 15,000–20,000 centipoises at 25° and an amine equivalent of 303.

*Production of foam*

300 parts of the prepolymer was mixed with 90 parts castor oil (Baker's Grade AA), the resulting mixture was vigorously stirred while rapidly adding an aqueous solution consisting of 30 parts tetrakis-(2-hydroxyethyl)-ethylenediamine and 12 parts catalyst-dispersing agent mixture (100 parts water, 50 parts diethylethanolamine and 50 parts "Triton X–100"). The foaming mass was poured into molds and allowed to expand freely. The foam was cured at room temperature for about twenty-four hours. Foams produced in this manner from low viscosity castor oil based prepolymers showed no evidence of shrinkage, and possessed good appearance, uniform pore size and high compression strength.

A foam produced in the same manner from the aforesaid isocyanate-prepolymer but omitting the tetrakis-(2-hydroxyethyl)-ethylendiamine underwent considerable shrinkage on curing and was highly unsuited for use as a shock absorber.

EXAMPLE 5

A semi-rigid foam containing a large amount of a fire retardant plasticizer, for example tris β-chloroethyl phosphate, was prepared in the following manner:

An emulsion was made by mixing thoroughly 100 parts of polyester (trimethylol propane and adipic acid, hydroxyl No. 465–495 and acid No. 15–20), 50 parts tris β-chloroethyl phosphate, 10 parts water, 1 part N-methyl morpholine, 2 parts tetrakis-(2-hydroxyethyl)-ethylenediamine and 1.5 parts non-ionic wetting agent ("Witco 77–86"). To this emulsion there was added 275 parts of a modified diisocyanate (tolylene diisocyanate, 80% 2,4-isomer and 20% 2,6-isomer, reacted with 10% by weight of 1,2,6-hexanetriol to give a product of amine equivalent of about 120); the reaction mixture was stirred for about 35 seconds before pouring the mass. The reaction mass was poured into a wooden panel sandwich structure which was clamped in a jig, whereby foaming took place in a confined space under a slight restraining pressure. The foam was cured in an air oven at 80° for 3 hours.

The foams produced in this manner were characterized by low density (1.7 to 1.9 lbs. per cu. ft.), good dimensional stability, heat resistance, absence of shrinkage on heating for 24 hours at 110° and non-migration of flame retardant.

Although certain preferred embodiments of the invention have been disclosed for purpose of illustration, it will be evident that various changes and modifications may be made therein without departing from the scope and spirit of the invention.

I claim:

1. A highly cross-linked polyurethane composition produced by reaction of an organic polyisocyanate and a polyol selected from the group consisting of an esterification product of a dicarboxylic acid and a polyhydric alcohol, a fatty acid glyceride having a hydroxyl number of at least 50 and a polyalkylene ether glycol having a molecular weight of at least 200 and a polyfunctional basic alcohol containing two tertiary amino groups and at least two primary alcoholic hydroxyl groups having the formula:

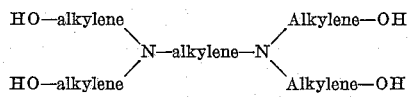

wherein alkylene means a divalent saturated aliphatic hydrocarbon radical containing from 1 to 10 carbon atoms and at least two of alkylene-OH groups contain primary alcoholic hydroxyl groups, said polyfunctional basic alcohol constituting from 0.1% to 30% by weight based on the weight of polyol, said organic polyisocyanate being employed in an amount such that there is an excess of available isocyanate groups over the total number of hydroxyl groups from the polyol and the polyfunctional basic alcohol, and an organic flame retardant selected from the group consisting of chlorinated phosphate esters, esters of organic phosphonic acids and esters of halogenated organic acids in an amount of 5% to 50% by weight of the polyol, organic polyisocyanate and polyfunctional basic alcohol.

2. A highly cross-linked polyurethane composition produced by reaction of an organic polyisocyanate and a polyol selected from the group consisting of an esterification product of a dicarboxylic acid and a polyhydric alcohol, a fatty acid glyceride having a hydroxyl number of at least 50 and a polyalkylene ether glycol having a molecular weight of at least 200 and a polyfunctional basic alcohol containing two tertiary amino groups and at least two primary alcohol hydroxyl groups having the formula:

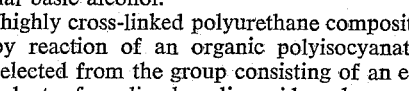

wherein alkylene means a divalent saturated aliphatic hydrocarbon radical containing from 2 to 4 carbon atoms and at least two of alkylene-OH groups contain primary alcoholic hydroxyl groups, said polyfunctional basic alcohol constituting from 0.1% to 30% by weight based on the weight of polyol, said organic polyisocyanate being employed in an amount such that there is an excess of available isocyanate groups over the total number of hydroxyl groups from the polyol and the polyfunctional basic alcohol, and an organic fire retardant selected from the group consisting of chlorinated phosphate esters, esters of organic phosphonic acids and esters of halogenated organic acids in an amount of 5% to 50% by weight of the polyol, organic polyisocyanate and polyfunctional basic alcohol.

3. A highly cross-linked polyurethane composition produced by reaction of an organic polyisocyanate and a polyester which is the esterification product of a dicarboxylic acid and a polyhydric alcohol and a polyfunctional basic alcohol containing two tertiary amino groups and at least two primary alcoholic hydroxyl groups having the formula:

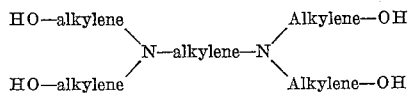

wherein alkylene means a divalent saturated aliphatic hydrocarbon radical containing from 2 to 4 carbon atoms and at least two of alkylene-OH groups contain primary alcoholic hydroxyl groups, said polyfunctional basic alcohol constituting from 7% to 15% by weight based on the weight of polyester, said organic polyisocyanate being employed in an amount such that there is an excess of available isocyanate groups over the total number of hydroxyl groups from the polyester and the polyfunctional basic alcohol, and an organic flame retardant selected from the group consisting of chlorinated phosphate esters, esters of organic phosphonic acids and esters of halogenated organic acids in an amount of 10% to 30% by weight of the polyester, organic polyisocyanate and polyfunctional basic alcohol.

4. A highly cross-linked polyurethane composition produced by reaction of an organic polyisocyanate and a polyalkylene ether glycol having a molecular weight of at least 200 and a polyfunctional basic alcohol containing two tertiary amino groups and at least two primary alcoholic hydroxyl groups having the formula:

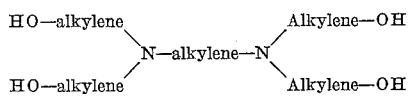

wherein alkylene means a divalent saturated aliphatic hydrocarbon radical containing from 2 to 4 carbon atoms and at least two of alkylene-OH groups contain primary alcoholic hydroxyl groups, said polyfunctional basic alcohol constituting from 7% to 15% by weight based on the weight of polyalkylene ether glycol, said organic polyisocyanate being employed in an amount such that there is an excess of available isocyanate groups over the total number of hydroxyl groups from the polyalkylene ether glycol and the polyfunctional basic alcohol, and an organic flame retardant selected from the group consisting of chlorinated phosphate esters, esters of organic phosphonic acids and esters of halogenated organic acids in an amount of 10% to 30% by weight of the polyalkylene ether glycol, organic polyisocyanate and polyfunctional basic alcohol.

5. A highly cross-linked polyurethane composition having fire retardant properties as claimed in claim 2 in which the polyol is a polyester of trimethylol propane and adipic acid, the polyfunctional basic alcohol is tetrakis-(2-hydroxyethyl)-ethylenediamine, the polyisocyanate is a triisocyanate from the reaction of 3 moles tolylene diisocyanate with 1 mole hexanetriol, and the organic fire retardant is tris β-chloroethyl phosphate.

6. A process for the production of highly cross-linked polyurethane compositions which comprises reacting an organic polyisocyanate and a polyol selected from the group consisting of an esterification product of a dicarboxylic acid and a polyhydric alcohol, a fatty acid glyceride having a hydroxyl number of at least 50 and a polyalkylene ether glycol having a molecular weight of at least 200 and a polyfunctional basic alcohol containing two tertiary amino groups and at least two primary alcoholic hydroxyl groups having the formula:

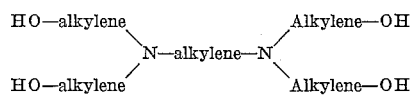

wherein alkylene means a divalent saturated aliphatic hydrocarbon radical containing from 1 to 10 carbon atoms and at least two of alkylene-OH groups contain primary alcoholic hydroxyl groups, said polyfunctional basic alcohol constituting from 0.1% to 30% by weight based on the weight of polyol, said organic polyisocyanate being employed in an amount such that there is an excess of available isocyanate groups over the total number of hydroxyl groups from the polyol and the polyfunctional basic alcohol, and an organic flame retardant selected from the group consisting of chlorinated phosphate esters, esters of organic phosphonic acids and esters of halogenated organic acids in an amount of 5% to 50% by weight of the polyol, organic polyisocyanate and polyfunctional basic alcohol.

7. A process for production of highly cross-linked polyurethane compositions which comprises reacting an organic polyisocyanate and a polyol selected from the group consisting of an esterification product of a dicarboxylic acid and a polyhydric alcohol, a fatty acid glyceride having a hydroxyl number of at least 50 and a polyalkylene ether glycol having a molecular weight of at least 200 and a polyfunctional basic alcohol containing two tertiary amino groups and at least two primary alcohol hydroxyl groups having the formula:

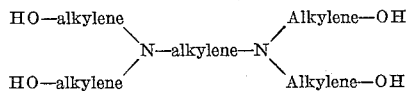

wherein alkylene means a divalent saturated aliphatic hydrocarbon radical containing from 2 to 4 carbon atoms and at least two of alkylene-OH groups contain primary alcoholic hydroxyl groups, said polyfunctional basic alcohol constituting from 0.1% to 30% by weight based on the weight of polyol, said organic polyisocyanate being employed in an amount such that there is an excess of available isocyanate groups over the total number of hydroxyl groups from the polyol and the polyfunctional basic alcohol, and an organic fire retardant selected from the group consisting of chlorinated phosphate esters, esters of organic phosphonic acids and esters of halogenated organic acids in an amount of 5% to 50% by weight of the polyol, organic polyisocyanate and polyfunctional basic alcohol.

8. A process for production of highly cross-linked polyurethane compositions which comprises reacting an organic polyisocyanate and a polyester which is the esterification product of a dicarboxylic acid and a polyhydric alcohol and a polyfunctional basic alcohol containing two tertiary amino groups and at least two primary alcoholic hydroxyl groups having the formula:

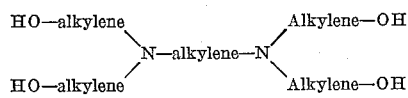

wherein alkylene means a divalent saturated aliphatic hydrocarbon radical containing from 2 to 4 carbon atoms and at least two of alkylene-OH groups contain primary alcoholic hydroxyl groups, said polyfunctional basic alcohol constituting from 7% to 15% by weight based on the weight of polyester, said organic polyisocyanate being employed in an amount such that there is an excess of available isocyanate groups over the total number of hydroxyl groups from the polyester and the polyfunctional basic alcohol, and an organic flame retardant selected from the group consisting of chlorinated phosphate esters, esters of organic phosphonic acids and esters of halogenated organic acids in an amount of 10% to 30% by weight of the polyester, organic polyisocyanate and polyfunctional basic alcohol.

9. A process for production of highly cross-linked polyurethane compositions which comprises reacting an organic polyisocyanate and a polyalkylene ether glycol having a molecular weight of at least 200 and a polyfunctional basic alcohol containing two tertiary amino groups and at least two primary alcoholic hydroxyl groups having the formula

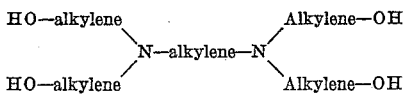

wherein alkylene means a divalent saturated aliphatic hydrocarbon radical containing from 2 to 4 carbon atoms and at least two of alkylene-OH groups contain primary alcoholic hydroxyl groups, said polyfunctional basic alcohol constituting from 7% to 15% by weight based on the weight of polyalkylene ether glycol, said organic polyisocyanate being employed in an amount such that there is an excess of available isocyanate groups over the total number of hydroxyl groups from the polyalkylene ether glycol, and the polyfunctional basic alcohol and an organic flame retardant selected from the group consisting of chlorinated phosphate esters, esters of organic phosphonic acids and esters of halogenated organic acids in an amount of 10% to 30% by weight of the polyalkylene ether glycol, organic polyisocyanate and polyfunctional basic alcohol.

10. A method of producing highly cross-linked cellular polyurethane compositions which comprises reacting by simultaneously mixing a polyol selected from the group consisting of an esterification product of a dicarboxylic acid and a polyhydric alcohol, a fatty acid glyceride having a hydroxyl number of at least 50 and a polyalkylene ether glycol having a molecular weight of at least 200, an organic polyisocyanate and a polyfunctional basic alcohol containing two tertiary amino groups and at least two primary alcoholic hydroxyl groups having the formula:

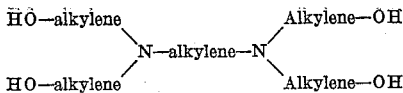

wherein alkylene means a divalent saturated aliphatic hydrocarbon radical containing from 1 to 10 carbon atoms and at least two of alkylene-OH groups contain primary alcoholic hydroxyl groups, said polyfunctional basic alcohol constituting from 0.1% to 30% by weight based on the weight of polyol, said organic polyisocyanate being employed in an amount such that there is an excess of available isocyanate groups over the total number of hydroxyl groups from the polyol and the polyfunctional basic alcohol, water and an organic flame retardant selected from the group consisting of chlorinated phosphate esters, esters of organic phosphonic acids and esters of halogenated organic acids in an amount of 5% to 50% by weight of the polyol, organic polyisocyanate and polyfunctional basic alcohol.

References Cited in the file of this patent

UNITED STATES PATENTS

| | | |
|---|---|---|
| 2,577,281 | Simon et al. | Dec. 4, 1951 |
| 2,764,565 | Hoppe et al. | Sept. 25, 1956 |
| 2,811,493 | Simon et al. | Oct. 29, 1957 |

FOREIGN PATENTS

| | | |
|---|---|---|
| 733,624 | Great Britain | July 13, 1955 |

OTHER REFERENCES

Che. and Eng. News, volume 35, No. 3, page 78, January 21, 1957.